United States Patent
Rehm

(10) Patent No.: US 7,597,035 B2
(45) Date of Patent: Oct. 6, 2009

(54) STEADY REST

(75) Inventor: Fritz Rehm, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 12/157,215

(22) Filed: Jun. 9, 2008

(65) Prior Publication Data

US 2009/0001643 A1    Jan. 1, 2009

(30) Foreign Application Priority Data

Jun. 26, 2007    (DE) .................... 10 2007 029 492

(51) Int. Cl.
*B23Q 1/25*    (2006.01)
*B24B 41/06*    (2006.01)

(52) U.S. Cl. ..................... 82/157; 82/162; 451/408

(58) Field of Classification Search ............... 82/157, 82/162–164; 451/365, 398, 406, 408
See application file for complete search history.

(56) References Cited

U.S. PATENT DOCUMENTS

| | | | | | |
|---|---|---|---|---|---|
| 3,535,963 A | * | 10/1970 | Dietl | ........................... | 82/162 |
| 4,416,174 A | * | 11/1983 | Owsen | ........................ | 82/162 |
| 4,519,279 A | * | 5/1985 | Ruggeri | ........................ | 82/162 |
| 4,546,681 A | * | 10/1985 | Owsen | ........................ | 82/162 |
| 4,754,673 A | * | 7/1988 | Hiestand | ........................ | 82/164 |
| 6,458,022 B1 | * | 10/2002 | Folz | ........................... | 451/365 |
| 6,505,533 B2 | * | 1/2003 | Kroisandt | ........................ | 82/53 |
| 2002/0029668 A1 | * | 3/2002 | Kroisandt | ........................ | 82/53 |

FOREIGN PATENT DOCUMENTS

DE    200 12 710    11/2000

* cited by examiner

*Primary Examiner*—Willmon Fridie
(74) *Attorney, Agent, or Firm*—Pandiscio & Pandiscio

(57) ABSTRACT

In a steady rest (1) with three holding elements (5, 6, 7), of which the two outer holding elements (6, 7) can be swivelled about articulated pins (8, 9) mounted in a housing (2) and the middle holding element (5) can be adjusted in a straight line, with one chip protection cap (11, 12) each provided with outlet ducts attached to one or both outer holding elements (6, 7) and with the possibility of supplying cooling or rinsing agent in a controlled fashion via ducts (13, 15) worked into the holding elements (6, 7) for application to the workpiece (10), each of the ducts (13, 15) provided in the outer holding elements (6, 7) is directly connected to a duct (27) running in the housing (2) of the steady rest (1) via kidney-shaped openings (21, 22) running concentrically to the articulated pins (8, 9).

9 Claims, 2 Drawing Sheets

… STEADY REST

Figure 1:
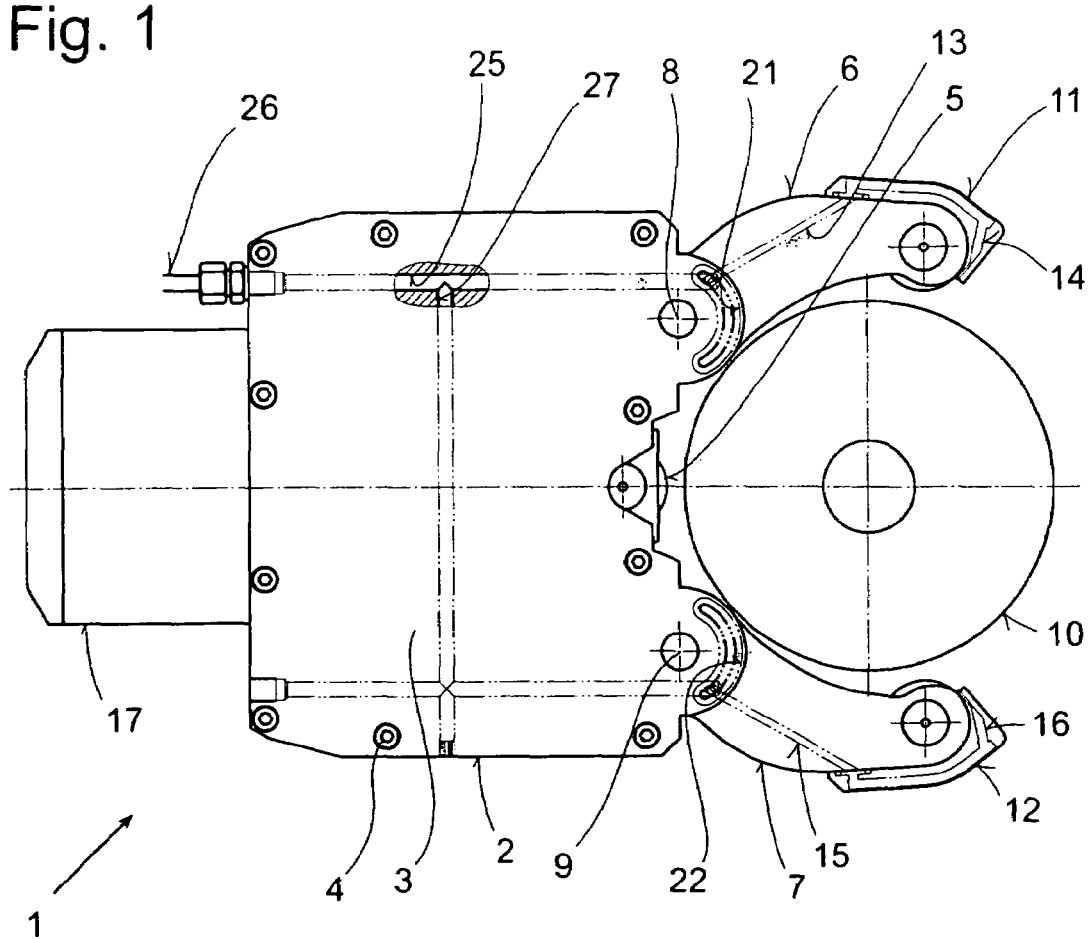

The present invention relates to a steady rest for central clamping of rod-shaped workpieces with a circular diameter on a lathe with three holding elements arranged in the same plane and provided with rollers, of which the two outer holding elements can be swivelled about articulated pins mounted in a housing and the middle holding element can be adjusted in a straight line in relation to the workpiece, with a chip protection cap provided with one or more outlet ducts attached to one or both outer holding elements, with the ability to supply cooling or rinsing agent in a controlled fashion via ducts worked in the holding elements for application onto the workpiece.

In steady rests of this kind, the coolant or lubricant flows to the outer holding elements via the articulated pins that carry these elements. For this purpose, several ring-shaped grooves usually circumferential in design are worked into the articulated pins and are interconnected and connected at one end to the housing of the steady rest and/or its cover as well as, at the other end, to ducts worked into the outer holding elements.

Although this supply of coolant or lubricant is widely used, in practice however difficulties often arise. Quite apart from the fact that the articulated pins have to be provided with a plurality of notches in order to manufacture the ring-shaped grooves for the coolant or lubricant as well as the seals, the seals are often damaged when the articulated pins are installed. This is because the articulated pins have to be pushed into the outer holding elements together with the seals, as well as into corresponding holes worked into the housing. Also, because the seals project beyond the external diameter of the articulated pins, it is practically impossible to avoid misalignments and in some cases also damage to the seal and incorrect positioning in the holding groove. In turn, this makes it impossible to maintain an additional seal and allows the coolant or lubricant to emerge from the gap between the articulated pin and the housing or housing cover and get into the inside of the steady rest. Since usually a water emulsion is used as the coolant, this results in oxidation within a very short time, principally of the components inside the housing. However, rust deposits on the control surfaces of the middle piece of the steady rest mean that the required high level of clamping accuracy is no longer provided, meaning that the steady rest has to be replaced, incurring a hefty financial loss.

It is therefore the task of the present invention to design the steady rest of the aforementioned kind in such a way that the supply of coolant or lubricant into the outer holding elements is guaranteed. In this case, the penetration of coolant or lubricant into the interior of the steady rest is reliably prevented without requiring a high level of construction complexity, in order to achieve the transfer from a fixed component into the swivelling outer holding elements. Furthermore, installation should be simplified and a reliable operating method should be provided at all times.

In accordance with the present invention, this is achieved in a steady rest of the aforementioned type in that each of the ducts provided in the outer holding elements is connected directly to a duct running in the housing of the steady rest or in a cover of the housing by means of an opening that, in a preferred embodiment, runs concentrically to the articulated pins of the holding elements and has a kidney-shaped profile which is worked into one of the adjacent components and is sealed laterally.

It is advantageous in this case for each of the openings to be worked into the cover of the housing with a constant distance from the axes of the articulated pins, and that the openings extend at least beyond the adjustment range of the outer holding elements.

Furthermore, it is appropriate for the housing or its cover to be provided with a central duct running, in a preferred embodiment, in a straight line for transporting the rinsing or cooling agent into one of the openings from which a side duct branches off in order to supply the coolant or lubricant to the other outer holding element, and for each of the openings to be sealed by means of a circumferential seal that is configured, in a preferred embodiment, endlessly.

In accordance with a preferred embodiment, there is provision for the interior of the housing of the steady rest to be sealed so it is liquid-tight by means of an O-ring or gasket inserted in the housing and/or its cover, or inserted between them, and configured, in a preferred embodiment, endlessly, in which case the seal should be guided concentrically around the articulated pins in an approximately semicircular shape and the interior of the housing of the steady rest should be pressurised by a barrier agent, preferably barrier air, supplied under positive pressure so that any penetration of dirt and moisture into the interior of the steady rest is almost excluded.

Furthermore, it is expedient for relief grooves connected to the atmosphere, preferably with a V-shaped cross section, to be worked into the housing and/or its cover in between the seals enclosing the openings and the seal assigned to the interior of the housing, in which case the relief grooves should run approximately mid-way between the seals and connected to the atmosphere in one or both end areas.

If a steady rest is configured in accordance with the present invention, it is possible to transport coolant or lubricant into the outer holder elements without the risk of it penetrating into the inside of the housing. The openings to which the ducts to be connected together are connected are namely reliably sealed by a circumferential seal and also the relief groove arranged between these seals and the seal assigned to the housing guarantees that, even if the seals around the openings tend to leak, the emerging coolant or lubricant will be drained away without problems. In addition, the positive pressure existing in the housing counteracts the penetration of moisture and/or dirt.

Furthermore, in the embodiment in accordance with the present invention, there is no need for machining of the articulated pins and also the ducts can be directly connected to the openings, with the effect that coolant or lubricant is transferred from a locationally fixed component into a swivelling component without requiring a complicated production procedure whilst nevertheless the transfer is sufficient to satisfy exacting requirements. Above all, however, it is assured that a steady rest configured in this manner will not have its function impaired by rust formation and that therefore a high level of clamping accuracy is provided over a long period.

Figure 3:
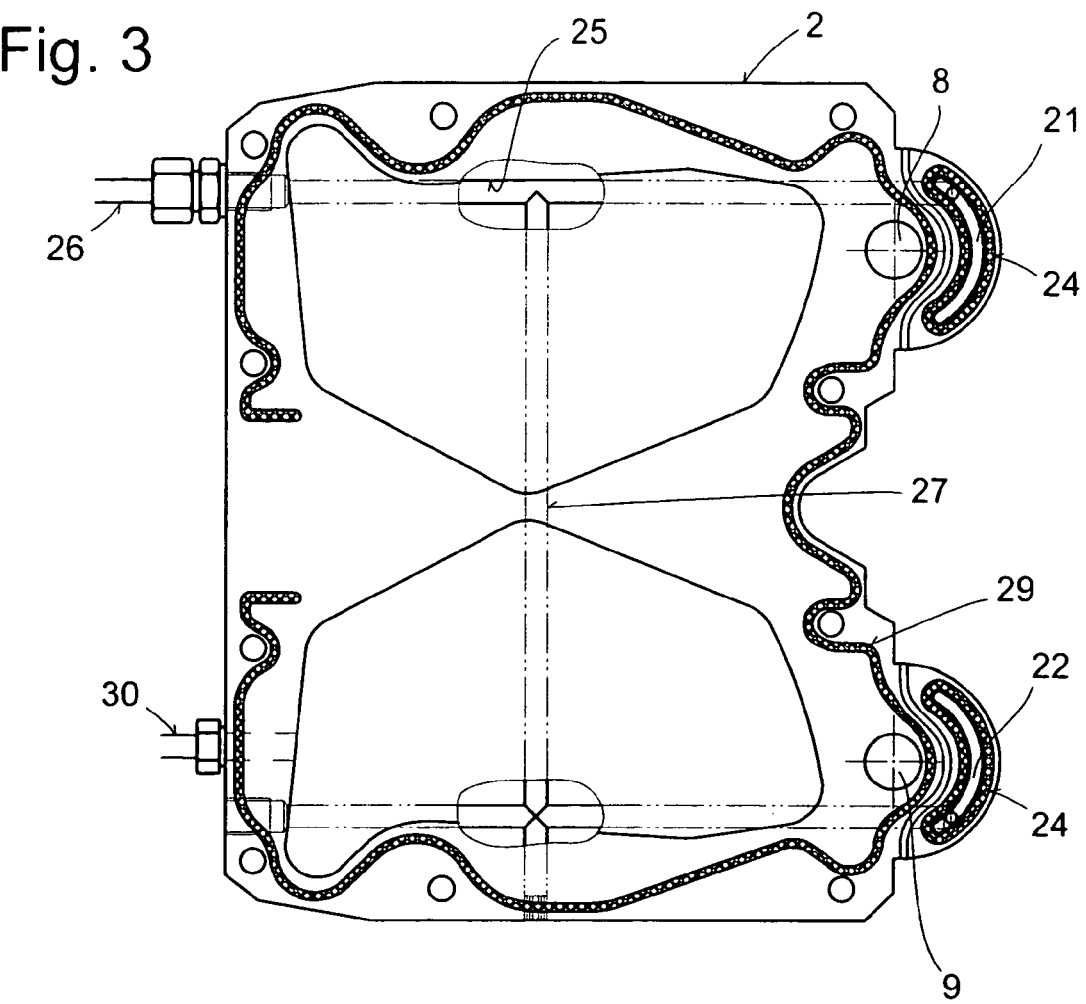
Figure 4:
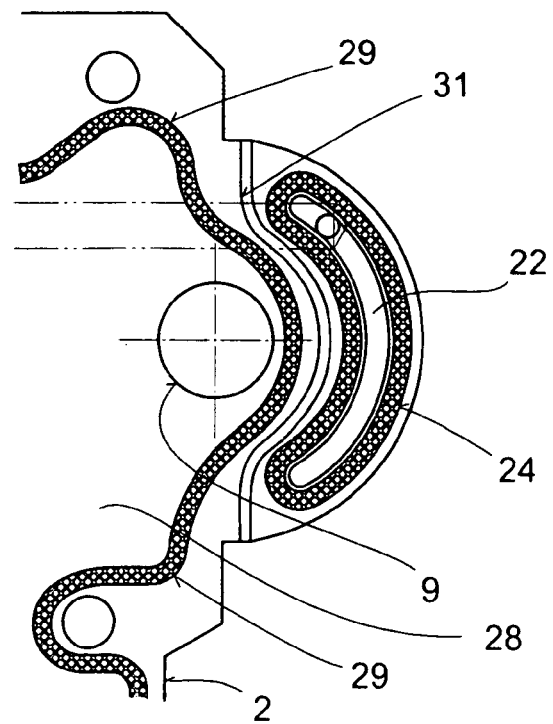

The drawing shows a sample embodiment of the steady rest configured in accordance with the present invention, the details of which are explained below. In the drawing, FIG. 1 shows a view of the steady rest with some of the supply ducts shown by broken lines, FIG. 2 shows a section of a side view of the steady rest in accordance with FIG. 1, in a magnified view, FIG. 3 shows the open housing of the steady rest in accordance with FIG. 1 with supply ducts worked into it and with seals inserted, and FIG. 4 shows a section from FIG. 3 in a magnified view.

The steady rest shown in FIG. 1 and identified with 1 is used for central clamping of rod-shaped workpieces 10 on a machine tool and consists chiefly of three holding elements 5, 6 and 7 arranged in a housing 2, which act jointly on the workpiece 10. The middle holding element 5 in this case can be moved axially in the direction of the tool 10 whereas the two outer holding elements 6 and 7 are mounted in a swivelling arrangement on articulated pins 8 and 9. In order to trigger swivelling movements, a middle piece that is not illustrated is attached to the middle holding element 5 that can be actuated by means of a servo device 17, with the middle piece being provided with control surfaces that are contacted by the outer holding elements 6 and 7. A cover 3 attached to the housing 2 by means of screws 4 closes the housing 2.

In order to supply coolant or lubricant to the workpiece 10 in the system of outer holding elements 6 and 7 equipped with rollers, the outer holding elements 6 and 7 are equipped with spray protection caps 11 and 12, and interconnected ducts 12 and 14 or 15 and 16 are worked into the outer holding elements 6 and 7 as well as the spray protection caps 11 and 12. The coolant and lubricant can therefore be supplied directly in the area of the system of the outer holding elements 6 and 7 on the workpiece 10.

Figure 2:
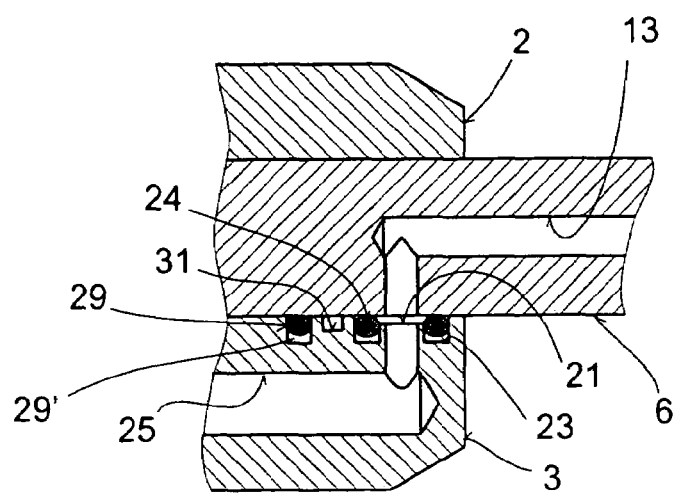

As is shown in particular in FIG. 2, kidney-shaped openings 21 and 22 are worked into the cover 3 of the housing 2 concentrically to the articulated pins 8 and 9 in order to transfer the cooling and rinsing agent to the ducts 13 and 14, with the ducts 12 and 15 provided in the outer holding elements 6 and 7 connected to one end of the openings 21 and 22, and ducts 25 and 27 worked into the housing cover connected to the other end. The cooling and rinsing agent in this case is transferred via a connection 26 into the duct 25 running in a straight line from which duct 27, which is referred to as a side duct, branches off and leads to the opening 22. The openings 21 and 22 are therefore evenly supplied with cooling or rinsing agent. O-ring seals 24, each inserted in a groove 23, provide a liquid-tight seal for openings 21 and 22 that extend at least over the adjustment range of the outer holding elements 6 and 7 in order to provide a continuous coverage with ducts 25 and 27.

The cooling or rinsing agent therefore emerges from a locationally fixed component, namely the cover 3 of housing 2, into the outer holding elements 6 and 6 which are usually stationary and, if not, then only swivel by a slight amount. However, as shown in FIG. 3, it is also possible to work the ducts 25 and 27 into the housing 2.

To prevent dirt or moisture penetrating the interior 28 of the housing 2, a seal 29 is provided between the housing 2 and the cover 3 as shown in FIGS. 3 and 4, with the seal 29 inserted into a groove 29' worked into the cover 3 and the ends of the seal 29 in contact with the middle piece that is not shown. However, a gasket can also be provided instead of the seal 29 configured as an O-ring. In addition, a barrier agent in the form of barrier air under a pressure of 0.5 to 1.0 bar is supplied to the interior 28 of the housing 2 via a connection 30, so that a slight positive pressure prevails in the interior 28 and therefore counteracts the ingress of foreign bodies.

In order reliably to preclude coolant or lubricant emerging from one of the openings 21 or 22 and penetrating into the interior 28 of the housing 2, one relief groove 31 each is worked into the housing 2 and/or the cover 3 in the area of the articulated pins 8 and 9 between the two seals 24 and 29. The relief groove 31 is arranged approximately centrally in relation to the two seals 24 and 29 and is connected to the atmosphere at both ends to allow any coolant or lubricant that does emerge to be channeled into the relief groove 31 and directed to the outside before it can get into the area of the seal 29.

What is claimed is:

1. A steady rest (1) for clamping of rod-shaped workpieces (10) of a circular configuration on a lathe with three holding elements (5, 6, 7) arranged in a plane and provided with rollers, of which two outer holding elements (6, 7) can be swivelled about articulated pins (8, 9) mounted in a housing (2) and a middle holding element (5) is adjustable in a straight line in relation to the workpiece (10), with a chip protection cap (11, 12) provided with one or more outlet ducts (14, 16), attached to at least one of the outer holding elements (6, 7), the outlet ducts being adapted to supply a cooling or rinsing agent in a controlled fashion via holding element ducts (13, 15) in the holding elements (6, 7) for application of the agent onto the workpiece (10), wherein each of the holding element ducts (13, 15) is connected directly to a housing duct (25) running in a selected one of the housing (2) of the steady rest (1) or in a cover (3) of the housing (2) by means of an opening (21, 22) that runs concentrically to the articulated pins (8, 9) of the holding elements (6 or 7) and has a kidney-shaped profile and is sealed laterally.

2. The steady rest in accordance with claim 1, wherein the opening (21, 22) is worked into the cover (3) of the housing (2) with a constant distance from the axis of the articulated pins (8, 9) and the openings (21, 22) extends at least beyond an adjustment range of the outer holding elements (6, 7).

3. The steady rest in accordance with claim 1, wherein a selected one of the housing (2) and the cover (3) is provided with the housing duct (25) running in a straight line for transporting the rinsing or cooling agent into one of the openings (21, 22), and from which a side duct (27) branches off in order to supply the coolant or lubricant to the other outer holding element (7).

4. The steady rest in accordance with claims 1, wherein each of the openings (21, 22) is sealed by means of a circumferential seal (24) that is configured endlessly.

5. The steady rest in accordance with claims 1, wherein the interior (28) of the housing (2) of the steady rest (1) is sealed so it is liquid-tight, by means of a selected one of an O-ring and a gasket (29) inserted in a selected one of the housing (2), the cover (3), and between the housing and cover, and configured endlessly.

6. The steady rest in accordance with claim 5, wherein each gasket (29) is disposed generally concentrically around an articulated pin (8, 9) in a generally semicircular shape.

7. The steady rest in accordance with claim 5, wherein the interior (28) of the housing (2) of the steady rest (1) is pressurised by barrier air, supplied under positive pressure.

8. The steady rest in accordance with claim 5, wherein relief grooves (31) in communication with the atmosphere, and having a V-shaped cross section, are disposed in a selected one of the housing (2) and the cover (3), between the seals (24) enclosing the openings (21, 22) and the gasket (29) assigned to the interior (28) of the housing (2).

9. The steady rest in accordance with claim 8, wherein each relief groove (31) runs generally mid-way between the seals (24) and gaskets (29) and is in communication with the atmosphere in at least one end area.

* * * * *